H. K. PORTER.
Bolt-Cutter.
No. 226,190            Patented April 6, 1880.
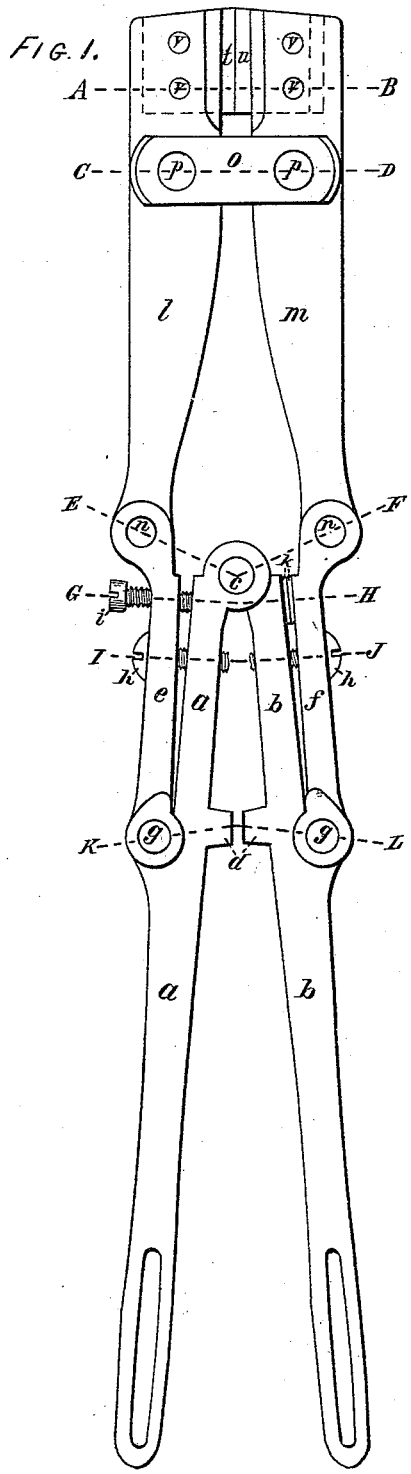
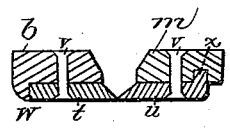
Fig. 2.
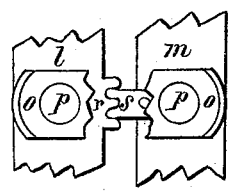
Fig. 3.
Fig. 4.
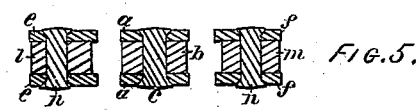
Fig. 5.
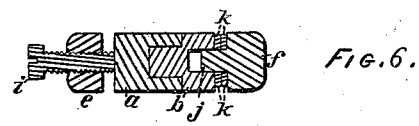
Fig. 6.
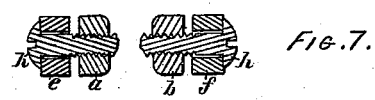
Fig. 7.
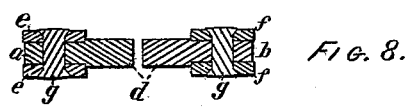
Fig. 8.
WITNESSES:
Herbert T. Whitman
E. B. Whitin
INVENTOR:
Henry K. Porter
By Porter & Hutchinson, Attys.

UNITED STATES PATENT OFFICE.

HENRY K. PORTER, OF BOSTON, MASSACHUSETTS.

BOLT-CUTTER.

SPECIFICATION forming part of Letters Patent No. 226,190, dated April 6, 1880.

Application filed June 17, 1879.

*To all whom it may concern:*

Be it known that I, HENRY K. PORTER, of Boston, State of Massachusetts, have invented an Improved Bolt-Cutter, of which the following is a specification.

This invention relates to certain improvements in that class of tools used for cutting bolts, rivets, wire, and other forms of metal, and which are provided with compound levers, and with cutters which are attached to or formed upon the short pair of levers; and the invention consists in such interlocking teeth being formed upon an arc of a circle having for a central joint the pivots $p\ p$, which connect the respective levers with the straps or fulcrum-bars $o\ o$; also, in corresponding and interlocking teeth formed upon or secured to the inner faces of the short levers, to hold said levers in proper longitudinal position relatively to the longer levers; also, in short supplemental adjustable arms, which are pivoted to the longer arms at one extremity and to the short arms at the other, and are provided with means of lateral adjustment relatively to the long arms, to compensate for the wear of the cutters which are secured to the short arms.

Figure 1 is a plan view of a bolt-cutter provided with my improvements. Fig. 2 is a transverse section taken on line A B, Fig. 1. Fig. 3 is a detached plan view, showing the pivotal devices of the short arms, the top bar being broken away to show the teeth. Fig. 4 is a transverse section taken on line C D, Fig. 1. Fig. 5 is a transverse section taken on line E F, Fig. 1. Fig. 6 is a transverse section taken on line G H, Fig. 1. Fig. 7 is a transverse section taken on line I J, Fig. 1. Fig. 8 is also a transverse section, taken on line K L, Fig. 1.

In these figures, $a\ b$ are the long levers or handles, which are pivoted together at $c$, and are held asunder, to protect the fingers of the operator, by the usual studs $d$.

$e\ f$ are the short arms, which are respectively pivoted to arms $a\ b$ at $g\ g$.

$h\ h$ are set-screws, which pass loosely through arms $e\ f$, and are threaded in arms $a\ b$, as shown in Fig. 7. The adjustment of these screws controls the divergence of arms $e\ f$ relatively to arms $a\ b$, and the arms $e\ f$ are held thus divergent either by a set-screw, as shown at $i$, and threaded in the short arm and bearing against the long arm, or by placing upon the stud $j$, formed upon the short arm, the required thickness of washers $k$, as shown in Figs. 1 and 6.

$l\ m$ are the short or cutting levers, which are respectively pivoted in arms $e\ f$ at $n\ n$. These levers are also pivoted in the straps $o\ o$ at $p\ p$, as shown in Figs. 1, 3, 4.

In Fig. 3 lever $l$ is shown with teeth $r$ formed thereon, while in Figs. 3, 4 lever $m$ is shown with the corresponding teeth $s$ secured thereto by rivets. When these levers are formed of cast metal these teeth will best be cast thereon; but if formed by forging the teeth may be preferably secured thereto by riveting, as shown. When these teeth are interlocked, as shown, the short arms are thereby held in line relatively to the longer arms; and such teeth being arranged upon an arc of a circle whose center is the pivots $p$, therefore the levers $l\ m$ may be freely vibrated upon such pivots without being cramped or bound by such interlocking teeth, which effectually prevent relative endwise displacement of the levers.

The cutting-blades $t\ u$ are secured to arms $l\ m$ by small rivets $v\ v$, as shown in Figs. 1, 2, and are shouldered, as shown at $w$ or at $x$, Fig. 2; but I prefer a shoulder raised on the lever, as at $w$, as then the steel cutter $t$ is but a flat plate of metal brought to a cutting-edge. By thus shouldering the cutters against the levers the cutters may be comparatively thin, and the holding-rivets small and readily "drifted" out, for the purpose of sharpening the cutters when dull or replacing them when worn out.

I claim as my invention—

1. In a compound lever-cutter, the supplemental arms $e\ f$, pivoted at one end to the handle-arms $a\ b$ and at the other end to the cutting-arms $l\ m$, and provided with means of divergent adjustment relatively to the handle-arms, substantially as specified.

2. In a compound lever-cutter, and in combination with lever $b$ and arm $f$, the set-screw $h$, stud $j$, and the insertible and removable washers $k$, substantially as specified.

3. In a compound lever-cutter, the interlocking teeth $r$ $s$, formed upon or secured to levers $l$ $m$, and arranged upon arcs of a circle whose center is the pivots $p$ $p$ of such levers, substantially as specified.

4. In a bolt-cutter, the combination of arms $a$ $b$, pivoted together, as at $c$, the arms $l$ $m$, pivoted, as at $p$ $p$, and intermediate connectors, pivoted to arms $l$ $m$, as at $n$ $n$, and secured to and laterally adjustable relatively to arms $a$ $b$, for the purpose specified.

HENRY K. PORTER.

Witnesses:
EUGENE HUMPHREY,
T. W. PORTER.